Dec. 18, 1934.  J. BOHLI  1,984,820
REGULATOR AND CUT-OUT RELAY FOR DYNAMOS
Filed May 2, 1933
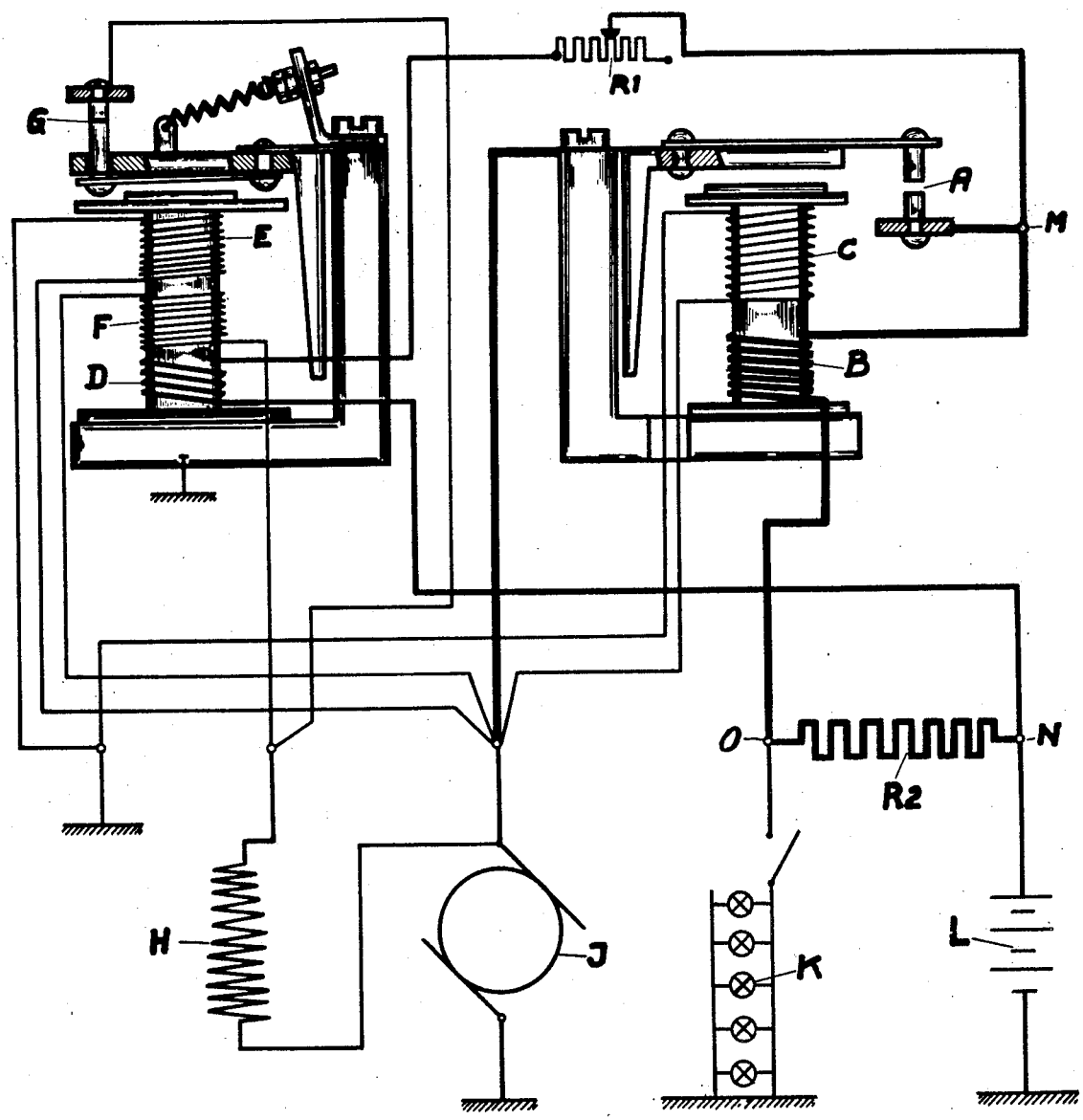
Inventor:
Jakob Bohli Patented Dec. 18, 1934

1,984,820

UNITED STATES PATENT OFFICE 1,984,820

REGULATOR AND CUT-OUT RELAY FOR DYNAMOS

Jakob Bohli, Solothurn, Switzerland

Application May 2, 1933, Serial No. 669,018
In Germany May 13, 1932

2 Claims. (Cl. 171—313)

The invention relates to a generator battery charging system. In known systems of this kind, the series winding of the regulator has been connected in series with the series winding of the cut-out relay. Such relays are designed for a certain value of the current to be transmitted; for greater values of the current a larger type relay must be used; therefore by connecting the series winding of the regulator and the series winding of the cut-out relay in series to each other, it is necessary to provide for each larger relay type a larger regulator coil, which means an appreciable disadvantage from a manufacturing standpoint.

Further, in such systems the load devices were connected directly to the battery; when the load devices were switched in, a considerable drop of voltage of the dynamo took place and as a result of this a high discharge of the battery; to prevent this, the voltage of the dynamo has to be regulated to a higher degree, so that when switching in the load devices the voltage of the dynamo remained above the voltage of the battery; this on its turn had the disadvantage that the battery after switching out the load devices was charged at too high a voltage.

According to the subject of the present invention the series winding of the regulator is arranged between the contact piece of the cut-out relay (dynamo) and the point to which the battery is connected, in parallel to the series winding of the cut-out relay and to a resistance which is in series to the latter winding; a resistance capable of being regulated is provided in series to the series winding of the regulator, and the load devices are switched in between the series winding of the cut-out relay and the resistance which is in series to the latter.

On the accompanying drawing a constructional form of the invention is schematically shown. A is the contact piece of the cut-out relay, the latter being under the influence of the series winding B and the voltage winding C. D is the series winding, E the voltage winding and F the demagnetizing winding of the regulator. G represents the contact of the regulator. H is the field winding of the dynamo and J the armature, K represents the load devices and L is the battery. R1 is a resistance connected in series with the series winding of the regulator and R2 a resistance in series with the series winding of the cut-out relay.

By switching the variable resistance R1 in series with the series winding D of the regulator the latter can be kept the same for various sizes of the cut-out relay by varying the sizes of the resistance R1. By arranging between point A and point N the series winding D in parallel to the series winding B of the cut-out relay and to the resistance R2 and connecting the load devices to a point between the series winding B and the resistance R2 the following effect is attained:

The voltage of the dynamo is normally so regulated that the battery is charged at a voltage of the dynamo which is not detrimental for the battery. If now in the arrangement according to this invention the load devices are switched in, the voltage of the dynamo does not drop down so far that the battery is discharged across the load devices and this for the reason of having the resistance R2 of a predetermined size. If the load devices were connected to point N without interposing a resistance R2, the voltage drop of the dynamo would be considerably higher when switching in the load devices. Either a discharge of the battery would take place in this case, or the voltage of the dynamo must be regulated to such a value that the same remains still above the one of the battery when switching in the load devices; this has the disadvantage that the battery after the load devices being switched out is charged at a voltage which is too high. The reason that the voltage of the dynamo does not go so far down in case the load devices are switched in at the point O instead of switching in at point N is the following: If the load devices are switched in at point O, the current flowing through the coil D is smaller than for the case of switching in the load devices at the point N, as in the former case in the circuit of the coil D the resistance of this coil and the resistance R2 are provided, in the latter case, however, the resistance of the coil D only. When the load devices are switched in at the point O, the effect of the coil D with respect to the contact points G is smaller, i. e. the voltage drop is smaller than in the case in which the load devices are switched in at the point N; in the latter case, the effect of the coil D is greater, as more current is flowing through the latter.

What I claim is:

1. In a generator battery charging system, in combination a dynamo, a regulator, a battery, a cut-out relay, a series winding of said cut-out relay, a series winding of said regulator, these two windings being arranged between the dynamo and the point to which said battery is connected in parallel to each other, load-devices in series with the series winding of the cut-out relay, a constant resistance arranged between said battery and said load devices, said load devices being arranged between the series winding of the cut-out relay and said constant resistance, which is in series with the latter.

2. In a generator battery charging system, in combination a dynamo, a regulator, a battery, a cut-out relay, a series winding of said cut-out relay, a series winding of said regulator, these two windings being arranged between the dynamo and the point to which said battery is connected in parallel to each other, a variable resistance in series with said series winding of the regulator adapted to suit the size of the cut-out relay, load devices in series with the series winding of the cut-out relay, a constant resistance arranged between said battery and said load devices, said load devices being arranged between the series winding of the cut-out relay and said constant resistance, which is in series with the latter.

JAKOB BOHLI.